(12) United States Patent
Luo et al.

(10) Patent No.: US 10,976,750 B2
(45) Date of Patent: Apr. 13, 2021

(54) BASE STATION FOR RECEIVING AND PROCESSING VEHICLE CONTROL INFORMATION AND/OR TRAFFIC STATE INFORMATION

(71) Applicant: HUAWEI TECHNOLOGIES CO., LTD., Guangdong (CN)

(72) Inventors: Jijun Luo, Munich (DE); Geng Zhou, Munich (DE); Karel Sotek, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/047,546

(22) Filed: Jul. 27, 2018

(65) Prior Publication Data
US 2018/0373267 A1 Dec. 27, 2018

Related U.S. Application Data

(63) Continuation of application No. PCT/EP2016/051947, filed on Jan. 29, 2016.

(51) Int. Cl.
*G05D 1/02* (2020.01)
*H04W 88/08* (2009.01)
(Continued)

(52) U.S. Cl.
CPC .......... *G05D 1/0285* (2013.01); *B60W 30/08* (2013.01); *G07C 5/008* (2013.01); *G08G 1/0112* (2013.01);
(Continued)

(58) Field of Classification Search
CPC .............. B60W 30/08; G05D 1/0285; G05D 2201/0213; G07C 5/008; G08G 1/0112; G08G 1/0141; H04W 4/44; H04W 88/08
See application file for complete search history.

(56) References Cited

U.S. PATENT DOCUMENTS

| | | | | |
|---|---|---|---|---|
| 5,926,117 A | * | 7/1999 | Gunji | G05D 1/0274 340/988 |
| 6,012,012 A | * | 1/2000 | Fleck | G08G 1/09685 701/117 |

(Continued)

FOREIGN PATENT DOCUMENTS

JP    2008197740 A    8/2008

OTHER PUBLICATIONS

International Search Report, dated Oct. 26, 2016, in International Application No. PCT/EP2016/051947 (5 pp.).

(Continued)

*Primary Examiner* — Babar Sarwar
(74) *Attorney, Agent, or Firm* — Womble Bond Dickinson (US) LLP

(57) ABSTRACT

The present invention provides a base station 100 for receiving vehicle control information and/or traffic state information from a vehicle control unit 400, preferably connected to the base station 100. The base station comprises a base band unit 101, and at least one interface 102, wherein the base band unit 101 is connected to the at least one interface 102, and wherein the at least one interface 102 is configured to communicate with at least one application processing unit 103 for processing the vehicle control information and/or the traffic state information in the at least one application processing unit 103, and to receive a result of the processing from the at least one application processing unit 103. The base station 100 is further configured to forward the result of the processing to the vehicle control unit 400.

14 Claims, 9 Drawing Sheets

(51) Int. Cl.
    *B60W 30/08* (2012.01)
    *H04W 4/44* (2018.01)
    *G07C 5/00* (2006.01)
    *G08G 1/01* (2006.01)

(52) U.S. Cl.
    CPC ............ *G08G 1/0141* (2013.01); *H04W 4/44* (2018.02); *H04W 88/08* (2013.01); *G05D 2201/0213* (2013.01)

(56) References Cited

U.S. PATENT DOCUMENTS

| | | | | |
|---|---|---|---|---|
| 8,344,864 | B1* | 1/2013 | Al-Mutawa | G08G 1/096775 340/435 |
| 10,389,815 | B2* | 8/2019 | Byun | H04W 4/44 |
| 2007/0260363 | A1* | 11/2007 | Miller | G06F 16/2379 701/2 |
| 2007/0276600 | A1* | 11/2007 | King | G08G 1/166 701/301 |
| 2008/0234002 | A1* | 9/2008 | Yamashita | H04W 4/06 455/561 |
| 2008/0294690 | A1* | 11/2008 | McClellan | G08G 1/096725 |
| 2009/0051510 | A1* | 2/2009 | Follmer | G07C 5/0808 340/425.5 |
| 2010/0075608 | A1* | 3/2010 | Ji | G07C 5/008 455/66.1 |
| 2010/0138141 | A1* | 6/2010 | Hayashida | G01C 21/26 701/118 |
| 2012/0236745 | A1* | 9/2012 | Nagai | H04W 4/46 370/252 |
| 2013/0184930 | A1* | 7/2013 | Fuehrer | G06F 17/00 701/32.3 |
| 2015/0055577 | A1* | 2/2015 | Han | H04L 1/1685 370/329 |
| 2015/0326668 | A1* | 11/2015 | Mader | H04W 4/44 455/404.1 |
| 2016/0217690 | A1* | 7/2016 | Yamasaki | H04W 4/44 |
| 2016/0232790 | A1* | 8/2016 | Massey | B60W 30/08 |
| 2016/0381539 | A1* | 12/2016 | Park | H04W 4/90 455/404.2 |
| 2017/0069209 | A1* | 3/2017 | Beaurepaire | G08G 1/0125 |
| 2017/0124788 | A1* | 5/2017 | Nishida | G06K 9/00805 |
| 2017/0132923 | A1* | 5/2017 | Li | G08G 1/0112 |
| 2017/0176192 | A1* | 6/2017 | Cardoso de Moura | G01C 21/3461 |
| 2017/0303272 | A1* | 10/2017 | Li | H04W 4/44 |
| 2018/0213519 | A1* | 7/2018 | Liu | H04W 4/025 |
| 2020/0074857 | A1* | 3/2020 | Karabinis | G08G 1/017 |

OTHER PUBLICATIONS

Written Opinion of the International Searching Authority, dated Oct. 26, 2016, in International Application No. PCT/EP2016/051947 (5 pp.).

International Search Report dated Oct. 26, 2016 in corresponding International Patent Application No. PCT/EP2016/051947.

\* cited by examiner

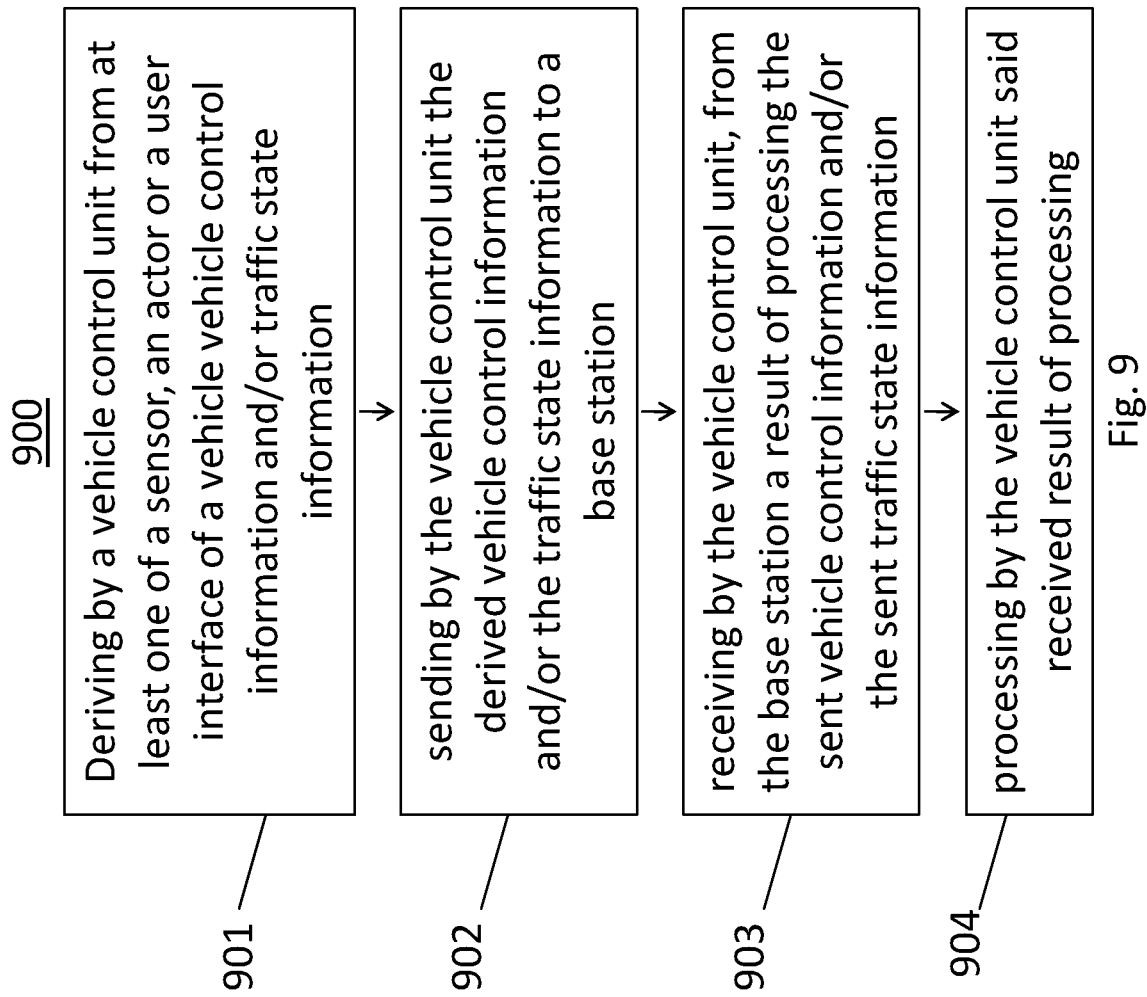

BASE STATION FOR RECEIVING AND PROCESSING VEHICLE CONTROL INFORMATION AND/OR TRAFFIC STATE INFORMATION

CROSS-REFERENCE TO RELATED APPLICATIONS

This application is a continuation of International Application No. PCT/EP2016/051947, filed on Jan. 29, 2016. The disclosures of the aforementioned applications are hereby incorporated by reference in their entireties.

TECHNICAL FIELD

The present invention is directed to a base station, a method and a vehicle control unit.

BACKGROUND

In current vehicle technology, vehicle control information or traffic state information is processed by vehicle electronics, e.g. by one or more vehicle control units, that are permanently integrated in the vehicle. In the conventional solutions, the vehicle control information and the traffic state information include any information regarding sensors, actors and user interfaces connected to the vehicle or information regarding traffic condition that is e.g. provided by public radio broadcasting and received by the vehicle. Typical applications and services that process the vehicle control information and/or the traffic state information in the vehicle are e.g. systems for vehicle navigation, driving assistance, entertainment or communication, as well as any other system or unit that processes the vehicle control information and/or the traffic state information. The life-cycle of vehicles and in particular of conventional vehicle electronics typically includes a development period of at least 3 years, a manufacturing period of minimum 5 years and an operation period of 10 years or more. The vehicle electronics are commonly designed during the development period of the vehicle, and are permanently integrated in the vehicle. Hence, the overall expected service time of the vehicle electronics is high, and gives rise to the problem of how to adapt the vehicle electronics to higher processing capabilities demanded by new applications and services that are developed during the life-cycle of the vehicle.

This problem is even more severe, considering that the applications and services being processed by the vehicle electronics can be updated to new applications and services during the life-cycle of the vehicle, while it is very difficult to adapt the processing capability of the vehicle electronics to the requirements of the new applications and services during the life-cycle of the vehicle.

The rapid development of new applications and services and the resulting gain of processing capability demanded by the new applications and services require a way to more easily expand the processing capability of processing technology in the car electronics. The new applications and services e.g. require processing technology that is renewed according to a life-cycle of typically less than 5 years from the beginning of the development period until the end of life of the processing technology.

Because of the differing typical product life-cycles of the vehicle electronics on the one hand side and the processing technology required by the new applications and services on the other hand side, a mismatch between the different life-cycles can be observed.

With an increasing number of vehicles being connected to communication networks, e.g. the internet, by means of wireless communication technologies such as e.g. GSM, UMTS or LTE, conventional solutions enable in-vehicle applications and services to send requests to and receive corresponding results from applications and services provided by third parties by means of the communication networks. Hence, vehicles can outsource the processing of information from the vehicle electronics to applications and services which are provided by means of communication networks. However, the information that can be outsourced for processing, and the applications and services that can be provided by means of the communication networks, are very limited for the following reasons.

The applications and services that can be provided to the vehicles by means of the communication networks are typically located in a datacenter connected to the communication networks. Network segments connecting the vehicles and the datacenters are typically associated with some uncertainty regarding availability, reliability, information security, and transmission time. As the applications and services provided by means of the communication networks are located in the datacenter, and are typically shared with other users of the datacenter, the processing capabilities provided by the datacenter are also difficult to predict. Additionally, the datacenter is located far away from the vehicles, which results in a long network path connecting the datacenter and the vehicles that is prone to the above mentioned uncertainties. While parameters such as availability, reliability, information security, transmission time and processing capabilities, provided in the way as described above, may be sufficient for most mobile computing scenarios (which require e.g. a reliability of 99.9%), there is no solution known in conventional solutions, for which said parameters are sufficient to comply with vehicle industry standards (which typically require e.g. a reliability of 99.999%), and in turn would enable to outsource the processing of the vehicle control information and/or the traffic state information from the vehicle electronics to the communication networks.

Another problem of the conventional solutions is that due to the above described uncertainties regarding information transmission, the vehicle control information and the traffic state information collected by one vehicle cannot be shared with other vehicles, in order to e.g. improve operating parameters of the other vehicles, such as energy consumption or shock absorber configuration, in real time.

Hence, to adapt the vehicle electronics to the higher processing capabilities demanded by new applications and services during the life-cycle of a vehicle, and to improve sharing of the vehicle control information and/or the traffic state information, among different vehicles, particularly the need arises for a way to provide processing capabilities by means of communication networks in a reliable, secure and rapid way, located geographically closer to the vehicles.

SUMMARY

In view of the above-mentioned disadvantages of conventional solutions, and the challenges for providing the processing capabilities to vehicle electronics by means of the communication networks, the present invention aims to improve the state of the art. The present invention has the object to provide a base station, a method, a vehicle control unit and a system that address and moderate the mismatch between the different life-cycles of vehicles and vehicle electronics. In particular, the present invention aims for a way to extend processing capabilities of vehicle electronics by means of communication networks in a reliable, secure and rapid way. To this end, the present invention intends to outsource the processing of the vehicle control information and/or the traffic state information from the vehicle electronics to the communication networks, particularly a base station. The present invention also desires simplified sharing of vehicle control information between vehicles. At the same time, the present invention aims for an easier way for third parties to provide applications for vehicles.

The above-mentioned object of the present invention is achieved by the solution provided in the enclosed independent claims. Advantageous implementations of the present invention are further defined in the respective dependent claims.

Embodiments of the present invention in particular allow expanding processing capabilities of vehicle electronics for processing vehicle control information and/or traffic state information by sending the vehicle control information and/or the traffic state information to a base station for processing in the base station, and by returning by the base station a result of the processing to the vehicle electronics. The base station preferably is a base station according to a 3GPP standard such as GSM, UMTS, LTE or 5G.

A first aspect of the present invention provides a base station for receiving vehicle control information and/or traffic state information from a vehicle control unit, preferably connected to the base station, the base station comprising: a base band unit, and at least one interface, wherein the base band unit is connected to the at least one interface, and wherein the at least one interface is configured to communicate with at least one application processing unit for processing the vehicle control information and/or the traffic state information in the at least one application processing unit and to receive a result of the processing from the at least one application processing unit, and wherein the base station is configured to forward the result of the processing to the vehicle control unit.

As an example the application processing unit can process the vehicle control information and the traffic state information together to achieve a combined result being based on both the vehicle control information and the traffic state information. This ensures that all information available is considered in the processing.

Hence, a way is provided for a vehicle to send the vehicle control information and/or the traffic state information to the base station, where the received information is processed by the at least one application processing unit that is connected to the base station by the at least one interface. The result of processing the vehicle control information and/or the traffic state information can in turn be sent back to the vehicle by the base station for further use or processing in the vehicle. Consequently, it is possible to expand the processing capabilities of the vehicle electronics of the vehicle by sending the vehicle control information and/or the traffic state information to the base station, where it is processed in the at least one application processing unit, before the result of the processing is sent back to the vehicle by the base station. Accordingly, the mismatch in life-cycles of vehicles and vehicle electronics is addressed.

As almost every presently manufactured vehicle is equipped with wireless communication technologies, providing the processing capabilities to the vehicle electronics by means of the base station that comprises an interface which is configured to communicate with at least one application processing unit is beneficial, as the base station is the closest network node to the vehicle in the communication networks.

The resulting short network path between the base station and the vehicle is less prone to failures, can be secured effectively and enables rapid and faultless communication. The application processing unit connected to the base station by means of the at least one interface can be exclusively used for processing the vehicle control information and/or the traffic state information and hence provides sufficient and predictable processing capabilities.

In addition, embodiments of the present invention can be used for collecting and/or processing the vehicle control information and the traffic state information that are provided by at least one vehicle, and for transmitting the collected and processed vehicle control information and the collected and processed traffic state information to at least one other vehicle. Specifically, embodiments of the invention allow to collect the traffic state information from other entities such as pedestrians, cyclists, traffic lights or traffic management systems and provide this information to the vehicles.

The base station, and in particular the at least one application processing unit preferably feature a modular design, which allows easy hardware upgrades in case of an increasing number of information that has to be processed by the base station as well as by the at least one application processing unit.

The base station preferably receives the vehicle control information and/or the traffic state information from a vehicle control unit that is directly connected to the base station, e.g. by wireless communication means. To this end, the vehicle control unit preferably comprises a mobile communication unit, which can wirelessly connect to a communication unit of the base station. The base station can, however, receive the vehicle control information and/or the traffic state information also via other communication means, e.g. by a wired core communication network. The vehicle control information and/or the traffic state information can be provided to the core communication network by means of traffic lights, traffic management systems or other base stations. One of the other base stations can, for instance, receive the vehicle control information and/or the traffic state information from a vehicle control unit that is directly connected to the other base station, and can in turn provide the received information to the core communication network. This ensures a seamless process of handing over a vehicle control unit from a first base station to a second base station.

In a first implementation form of the base station according to the first aspect as such, the base station is a base station according to a 3GPP standard such as GSM, UMTS, LTE or 5G.

As the base station can be a base station according to a 3GPP standard such as e.g. GSM, UMTS, LTE or 5G and future standards, these widely adopted wireless communication technologies can be used for sending and receiving information.

In a second implementation form of the base station according to the first aspect as such or according to the first implementation form of the first aspect, the at least one interface comprises a software interface and the at least one application processing unit is part of the base station, and/or the at least one interface comprises a hardware interface connectable to at least one application processing unit.

The software interface ensures an open and unified way for developing and providing applications and services to the application processing unit by third parties. The application processing unit itself can be provided by the manufacturer of the base station. Hence, third parties can focus on developing the applications and services and do not need to provide the application processing units by themselves. The software interface can be used to only provide limited access to security and safety related functions of the base station.

The hardware interface facilitates ease of future upgrades of the application processing units. By being connectable by means of the hardware interface, application processing units as well as applications and services controlling the application processing units can be provided to the base station by a third party manufacturer. Hence, the third party manufacturer has more flexibility in providing the applications, services and application processing units. An operator of a communication network additionally has increased flexibility, as locations of the base stations and the application processing units can be selected independently.

In a third implementation form of the base station according to the first aspect as such or according to any previous implementation form of the first aspect, the vehicle control information includes information regarding at least one of a sensor, an actor or a user interface of at least one vehicle.

This ensures that the base station can expand the processing capability of the vehicle electronics of the vehicle, and can share the vehicle control information among multiple vehicles.

In a fourth implementation form of the base station according to the first aspect as such or according to any previous implementation form of the first aspect, the traffic state information includes information regarding position and/or movement of at least one of a pedestrian, a bicycle or a vehicle and/or information provided by at least one traffic light or at least one traffic management system.

This ensures that the traffic state information can provide information regarding positions where critical conditions, such as accidents or traffic congestion, are likely to occur.

In a fifth implementation form of the base station according to the first aspect as such or according to any previous implementation form of the first aspect the base station additionally comprises an error correction unit configured to apply error correction to the vehicle control information and/or the traffic state information received by the base station and/or to the result of the processing forwarded by the base station.

Error correction enables more reliable delivery of information over an unreliable communication channel such as a wireless communication network.

In a sixth implementation form of the base station according to the first aspect as such or according to any previous implementation form of the first aspect, the error correction unit additionally comprises a determining unit, configured to determine whether received and/or sent information is the vehicle control information and/or the traffic state information and/or the result of the processing and to apply error correction to the received and/or sent information when the received and/or sent information is the vehicle control information and/or the traffic state information and/or the result of the processing.

By exclusively applying error correction to particular information, overall speed and efficiency of information processing in the base station is improved.

In a seventh implementation form of the base station according to the first aspect as such or according to any previous implementation form of the first aspect the base station additionally comprises a security unit, configured to determine whether the received vehicle control information and/or the received traffic state information is permitted vehicle control information and/or permitted traffic state information, and the at least one interface further is configured to communicate with at least one application processing unit to exclusively process the permitted vehicle control information and/or the permitted traffic state information in the at least one application processing unit.

The security unit ensures to prohibit the injection of malicious vehicle control information and/or malicious traffic state information (which e.g. aims at inducing an accident or ineffective energy consumption of a vehicle).

A second aspect of the present invention provides a method comprising the steps of receiving, by a base station, vehicle control information and/or traffic state information from a vehicle control unit, preferably connected to the base station, forwarding, by a base band unit of the base station, the vehicle control information and/or the traffic state information to at least one application processing unit by means of at least one interface comprised in the base station, receiving, by the base band unit of the base station, a result of processing the vehicle control information and/or the traffic state information from the at least one application processing unit by means of the at least one interface, and sending, by the base station, the result of the processing to the vehicle control unit.

The method of the second aspect and its implementation forms achieve the same advantages as the base station of the first aspect and its implementation forms, respectively. Further implementation forms of the method of the second aspect directly result from the functionality of the base station of the first aspect.

A third aspect of the present invention provides a vehicle control unit, wherein the vehicle control unit is configured to derive from at least one of a sensor, an actor or a user interface of a vehicle control information and/or traffic state information, wherein the vehicle control unit is further configured to communicate with a base station to send the derived vehicle control information and/or the traffic state information to the base station, and to receive from the base station a result of processing the sent vehicle control information and/or the sent traffic state information, wherein the vehicle control unit is configured to process the received result of the processing.

This ensures that the vehicle control information and/or the traffic state information generated by the at least one sensor, the at least one actor or the at least one user interface, can be processed in the base station, and that the result of processing the vehicle control information and/or the traffic state information can be provided back to the vehicle control unit by the base station. Hence, it can be achieved that with future updates on the base station the information derived by the vehicle control unit can be used for new applications or uses cases without a need for changing the vehicle control unit. The result of the processing of the information provided by the vehicle control unit can then be used in the vehicle to enhance the capabilities of the vehicle. As an example, a new pedestrian recognizing algorithm could be implemented in the base station whereas the input between the new algorithm and an old algorithm typically stays the same (such as video data, radar data etc. provided from the vehicle). Every vehicle connected to the base station could then profit from this new algorithm as the base station transmits the result of such algorithm back to the vehicle. However, no change to the individual vehicle is needed.

In a first implementation form of the vehicle control unit according to the third aspect as such, the vehicle control unit is further configured to control at least one of a sensor, an actor or user interface of the vehicle according to the result of the processing received from the base station.

This ensures that after the result of the processing is transmitted back to the vehicle control unit, it can be used to control at least one of a sensor, an actor or a user interface of the vehicle. Subsequently, a way is provided to expand the processing capabilities of vehicle electronics (i.e. all vehicle control units, sensors, actors, user interfaces and any other electronic module, unit or system comprised by the vehicle) by processing the vehicle control information and/or the traffic state information in the base station.

The vehicle control unit also enables to control applications and services provided by means of the communication networks in the at least one application processing unit of the base station and to receive information returning from the applications and services provided by the at least one application processing unit. The received information can be output by means of the user interface of the vehicle or can be used to control the sensors and actors of the vehicle.

In a second implementation form of the vehicle control unit according to the third aspect as such or according to the first implementation form of the third aspect, the vehicle control unit additionally comprises an error correction unit configured to apply error correction to the vehicle control information and/or the traffic state information sent to the base station and/or to the result of the processing received from the base station.

Error correction enables more reliable delivery of information over an unreliable communication channel such as a wireless communication network.

In a third implementation form of the vehicle control unit according to the third aspect as such or according to any previous implementation form of the third aspect, the error correction unit additionally comprises a determining unit, configured to determine whether received and/or sent information is the vehicle control information and/or the traffic state information and/or the result of the processing and to apply error correction to the received and/or sent information when the received and/or sent information is the vehicle control information and/or the traffic state information and/or the result of the processing.

By exclusively applying error correction to particular information, overall speed and efficiency of information processing in the vehicle control unit is improved.

In a fourth implementation form of the vehicle control unit according to the third aspect as such or according to any previous implementation form of the third aspect, the vehicle control unit additionally comprises a security unit, configured to determine whether the result of the processing received from the base station is a permitted result of processing, and wherein the vehicle control unit is further configured to exclusively control at least one of a sensor, an actor or user interface of the vehicle according to the permitted result of processing.

The security unit ensures to prohibit the injection of malicious results of processing the vehicle control information and/or the traffic state information (which e.g. aims at inducing an accident or ineffective energy consumption of a vehicle).

A fourth aspect of the present invention provides a method comprising the steps of deriving, by a vehicle control unit from at least one of a sensor, an actor or a user interface of a vehicle vehicle control information and/or traffic state information, sending, by the vehicle control unit, the derived vehicle control information and/or the traffic state information to a base station, receiving, by the vehicle control unit, from the base station a result of processing the sent vehicle control information and/or the sent traffic state information, processing, by the vehicle control unit, said received result of processing.

The method of the fourth aspect and its implementation forms achieve the same advantages as the vehicle control unit of the third aspect and its implementation forms, respectively. Further implementation forms of the method of the fourth aspect directly result from the functionality of the vehicle control unit of the third aspect.

A fifth aspect of the present invention provides a system comprising at least one base station according to the first aspect as such or according to any implementation form of the first aspect, and at least one vehicle control unit according to the third aspect as such or according to any implementation form of the third aspect.

The system of the fourth aspect and its implementation forms achieve the same advantages as the base station of the first aspect and its implementation forms, the method of the second aspect and its implementation forms and the vehicle control unit of the third aspect and its implementation forms, respectively.

BRIEF DESCRIPTION OF DRAWINGS

The above-described aspects and implementation forms of the present invention will be explained in the following description of specific embodiments in relation to the enclosed drawings, in which

FIG. 9 shows a flow-diagram of a method according to an embodiment of the present invention.

DETAILED DESCRIPTION OF EMBODIMENTS

Generally, it has to be noted that all arrangements, devices, modules, components, models, elements, units and means and so forth described in the present application could be implemented by software or hardware elements or any kind of combination thereof. All steps which are performed by the various entities described in the present application as well as the functionality described to be performed by the various entities are intended to mean that the respective entity is adapted to or configured to perform the respective steps and functionalities. Even if in the following description of the specific embodiments, a specific functionality or step to be performed by a general entity is not reflected in the description of a specific detailed element of the entity which performs the specific step or functionality, it should be clear for a skilled person that these methods and functionalities can be implemented in respective hardware or software elements, or any kind of combination thereof. Further, the method of the present invention and its various steps are embodied in the functionalities of the various described apparatus elements.

Figure 1:
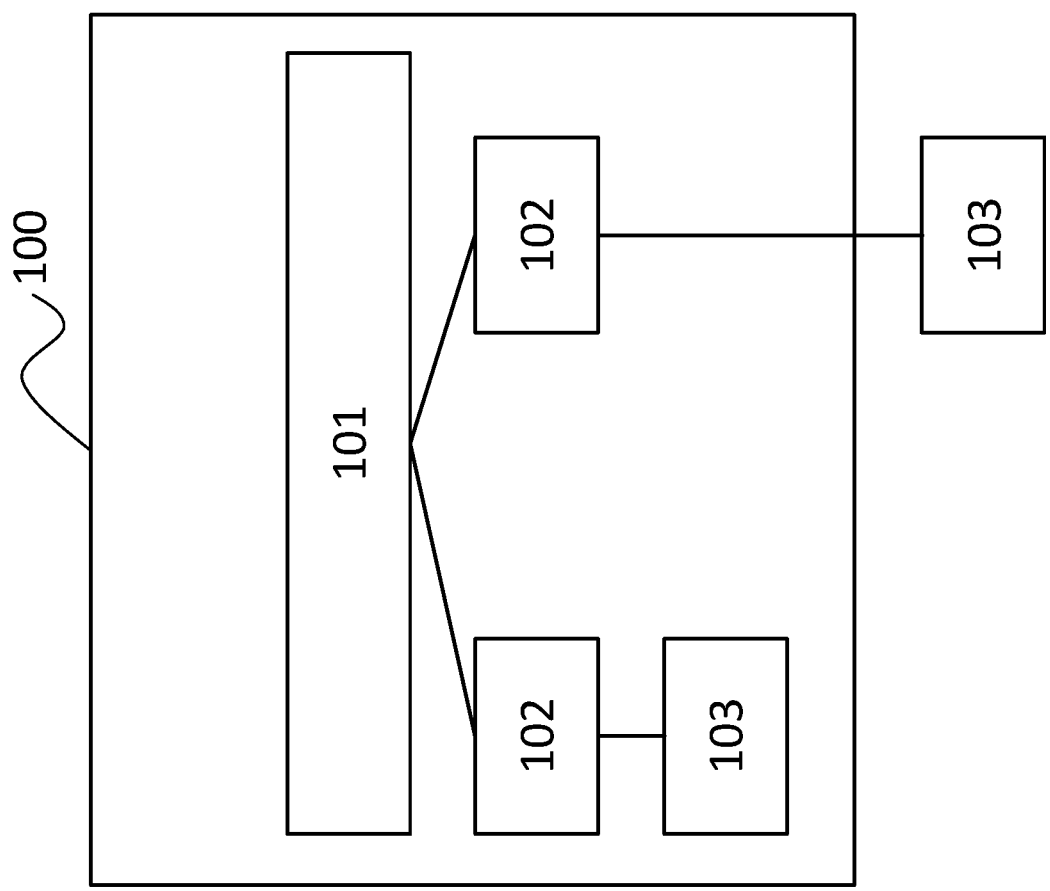
FIG. 1 shows a schematic overview of a base station according to an embodiment of the present invention.

FIG. 1 shows a schematic overview of a base station 100 for receiving vehicle control information and/or traffic state information from a vehicle control unit according to an embodiment of the present invention. The base station 100 comprises a baseband unit 101 and at least one interface 102. In FIG. 1, two interfaces 102 are shown. However, there can be also more or less interfaces 102.

The baseband unit 101 is preferably configured to establish connection to a core communication network to send and receive basic operating information and in particular the vehicle control information and/or the traffic state information. Being connected to the core communication network enables the base station 100 to exchange the vehicle control information and/or the traffic state information as well as a result of processing the vehicle control information and/or the traffic state information with other entities such as further base stations 100, data centers, traffic lights or traffic management systems. The baseband unit 101 can further be connected to a radio unit that is comprised by the base station 100, which enables the base station 100 to send and receive information, in particular the vehicle control information and/or the traffic state information as well as the result of processing the vehicle control information and/or the traffic state information, by means of wireless communication technologies. As the base station 100 can be a base station 100 according to a 3GPP standard such as e.g. GSM, UMTS, LTE or 5G and future standards, these wireless communication technologies can be used for sending and receiving information. The baseband unit 101 is exemplarily further connected to the two interfaces 102. Thereby, for the base station 100, a way is provided to exchange information between the core communication network, the radio unit, the baseband unit 101 and the interfaces 102. This information can include the vehicle control information and/or the traffic state information as well as the result of processing the vehicle control information and/or the traffic state information.

The at least one interface 102 is further configured to communicate with at least one application processing unit 103. In FIG. 1 one application processing unit 103 connected to one interface 102 each is shown. However, there can also be more application processing units 103 connected to one interface 102. The at least one application processing unit 103 is configured to receive the vehicle control information and/or the traffic state information by means of the at least one interface 102, process the received vehicle control information and/or the received traffic state information, and transmit the result of processing the vehicle control information and/or the traffic state information back to the at least one interface 102. This enables the base station 100 to receive the vehicle control information and/or the traffic state information by means of the core communication network and/or the radio unit, which is in turn forwarded to the at least one application processing unit 103 by means of the baseband unit 101 and the at least one interface 102. The at least one application processing unit 103 processes the vehicle control information and/or the traffic state information, returns the result of processing the vehicle control information and/or the traffic state information to the baseband unit 101 by means of the at least one interface 102, which result of processing is then transmitted via the radio unit of the base station 100 or the core communication network.

Hence, a way is provided for a vehicle to send the vehicle control information and/or the traffic state information to the base station 100, where the received information is processed by the at least one application processing unit 103 that is connected to the base band unit 101 by the at least one interface 102. The result of processing the vehicle control information and/or the traffic state information can in turn be sent back to the vehicle by the base station 100 for further processing. Consequently, a way is provided to expand processing capabilities of the vehicle electronics of a vehicle by sending the vehicle control information and/or the traffic state information to the base station 100, where it is processed in the at least one application processing unit 103, before the result of the processing is sent back to the vehicle by the base station 100.

The base station 100, and in particular the at least one application processing unit 103 preferably feature a modular design, which allows easy hardware upgrades in case of an increasing number of information that has to be processed by the base station 100 as well as by the at least one application processing unit 103. Hardware upgrades of the application processing units 103, which feature a modular design, are easier to implement compared to upgrading the vehicle electronics that are permanently built into the vehicles 404.

In FIG. 1, two interfaces 102 are shown. The first one of the two interfaces 102 is connected to an application processing unit 103, which is part of the base station 100. In FIG. 1, this is illustrated by the application processing unit 103, which is part of the base station 100, being located inside the rectangle marked with position number 100 (i.e. inside the base station 100). In case that the application processing unit 103 is part of the base station 100, the first one of the two interfaces 102, which is connected to the application processing unit 103, is a software interface 102. The software interface 102, which can be an application programming interface (API), provides access to the underlying resources (such as memory, CPU, storage, etc.) of the application processing unit 103 by a predefined set of routines, protocols, and tools. The software interface 102 can be used by third parties for developing applications and services which are executed in the application processing unit 103, and which can influence the processing of the vehicle control information and/or the traffic state information in the application processing unit 103. While the software interface 102 provides an open and unified way for developing the applications and services by third parties, the application processing unit 103 can be provided by the manufacturer of the base station 100. Hence, third parties can focus on developing the applications and services and don't need to provide the application processing units 103 by themselves. The software interface 102 however can be used to only provide limited access to security and safety related functions of the base station 100.

In FIG. 1, the second one of the two interfaces 102 is connectable to the at least one application processing unit 103. In FIG. 1, this is illustrated by the application processing unit 103, to which the second interface 102 is connectable to, being located outside the rectangle marked with position number 100 (i.e. outside the base station 100). In the base station 100 according to the present invention, the application processing unit 103 does not have to be part of the base station 100. In case that the interface 102 is connectable to an application processing unit 103 which is not comprised by the base station 100, the interface 102 is a hardware interface 102. The hardware interface 102 can e.g. be an electrical connector or an electro-mechanical device for joining electrical circuits.

The hardware interface 102 can provide a modular and unified design, and facilitates ease of future upgrades of the application processing units 103. By being connectable by means of the hardware interface 102, the application processing units 103 as well as applications and services controlling the application processing units 103, can be provided to the base station 100 by a third party manufacturer. Hence, the third party manufacturer has more flexibility in providing the applications, services and application processing units 103. An operator of a communication network additionally has increased flexibility, as locations of the base stations 100 and the application processing units 103 can be selected independently.

The base station 100 according to the present invention can comprise at least one software interface 102 and/or at least one hardware interface 102 as described above, to be easily customizable to the specific needs of an operator of a communication network. The base station 100 does not need to provide both types of interfaces 102 simultaneously.

The vehicle control information received and processed by the base station 100, as well as the result of the processing that is sent by the base station 100 can include information regarding at least one of a sensor, and actor or a user interface of at least one vehicle, which allows the base station 100 to expand the processing capability of the vehicle electronics of the vehicle, and to share the vehicle control information as well as the result of processing the vehicle control information among multiple vehicles.

The vehicle control information can also include information regarding an entertainment system, communication system or mobile office system of the vehicle. Hence, processing information regarding the entertainment, communication or mobile office application of the vehicle can be outsourced to the base station 100.

The traffic state information can include information regarding position and/or movement of at least one of a pedestrian, a bicycle or a vehicle and/or information provided by at least one traffic light or at least one traffic management system. The traffic state information hence can include information regarding positions where critical conditions, such as accidents or traffic congestion, are likely to occur. The traffic state information can be collected by the sensors or the user interface of the vehicle, e.g. by a camera integrated in the vehicle that observes the road, or by a user that provides an input by means of the user interface.

The traffic state information, and in particular the position of road users, can also be collected by pedestrians, bicycles and similar moveable objects. Devices for collecting the traffic state information can be user equipment such as mobile phones or any other device that includes units for determining a geographical position and for radio communication. Hence receiving and processing the traffic state information by the base station 100 as well as sending back the result of processing the traffic state information by the base station 100 can improve comfort and safety of all kinds of road users.

To receive vehicle control information and/or traffic state information, the base station 100 can communicate with vehicle control units of vehicles, as well as with any other device for collecting the traffic state information and/or the vehicle control information, which can be a user equipment, such as a mobile phone, or a device that includes units for determining a geographical position or for radio communication.

The vehicle control information and the traffic state information can partly overlap, as it is for example possible to detect the position of a cyclist riding a bicycle by means of a camera integrated in a vehicle and the geographical positioning system of the vehicle as well as by means of a mobile phone the cyclist is carrying, which is equipped with a geographical positioning system. Redundancy of overlapping vehicle control information and traffic state information can be used to improve accuracy of the results of processing the vehicle control information and the traffic state information in the at least one application processing unit 103.

Figure 2:
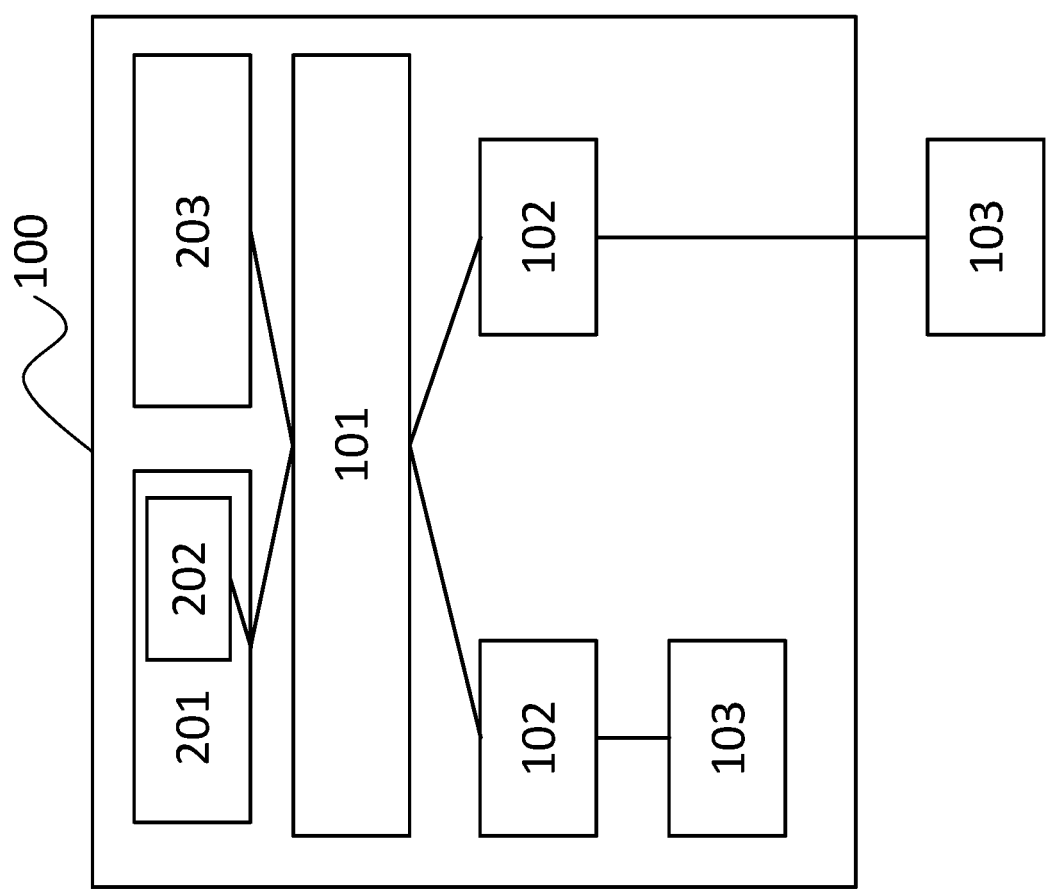
FIG. 2 shows a schematic overview of a base station according to an embodiment of the present invention in more detail.

FIG. 2 shows a schematic overview of the base station 100 according to the present invention in more detail. In FIG. 2, the base station 100 additionally comprises an error correction unit 201 that is connected to the baseband unit 101. The error correction unit 201 can apply error correction to the vehicle control information and/or the traffic state information received by the base station 100 and/or to the result of the processing forwarded by the base station 100. Error correction enables more reliable delivery of information over an unreliable communication channel such as a wireless communication network. The error correction unit 201 can apply error detection schemes such as repetition codes, parity bits, checksums, cyclic redundancy checks, cryptographic hash functions and error correction codes for the detection of presence of errors in the transmitted information. Correction of errors can be achieved by automatic repeat requests, error correction codes and hybrid schemes. The error correction unit 201 provides to achieve the high reliability of transmission of information, which is necessary to be compliant with the requirements of vehicle industry standards. Vehicle industry standards e.g. require reliability of greater than 99.999%. That means that 99.999% of all transmitted information has to be transmitted correctly. 3GPP standards only require reliability of greater than 99.9%.

The error correction unit 201, as shown in FIG. 2, can additionally comprise a determining unit 202. The determining unit 202 allows determining, whether the information sent and or received by the base station 100 is the vehicle control information and/or the traffic state information and/or the result of the processing. This information is provided to the error correction unit 201, which in turn only applies error correction to the vehicle control information and/or the traffic state information and/or the result of the processing which is received and/or sent by the base station 100. By exclusively applying error correction to particular information, overall speed and efficiency of information processing in the base station 100 is improved.

As depicted in FIG. 2, the base station 100 additionally can comprise a security unit 203. The security unit 203 can determine, whether the received vehicle control information and/or the received traffic state information is permitted vehicle control information and/or permitted traffic state information. The result of this analysis is communicated by the at least one interface 102 to the at least one application processing unit 103 to exclusively process the permitted vehicle control information and/or the permitted traffic state information in the at least one application processing unit 103. The security unit 203 e.g. can determine on the one hand, whether the vehicle control information and/or the traffic state information was sent by an authenticated sender or, on the other hand, whether it was altered on the way from the sender to the receiver. Hence the injection of malicious vehicle control information and/or malicious traffic state information (which e.g. aims at inducing an accident or ineffective energy consumption of a vehicle) can be avoided.

Figure 3:
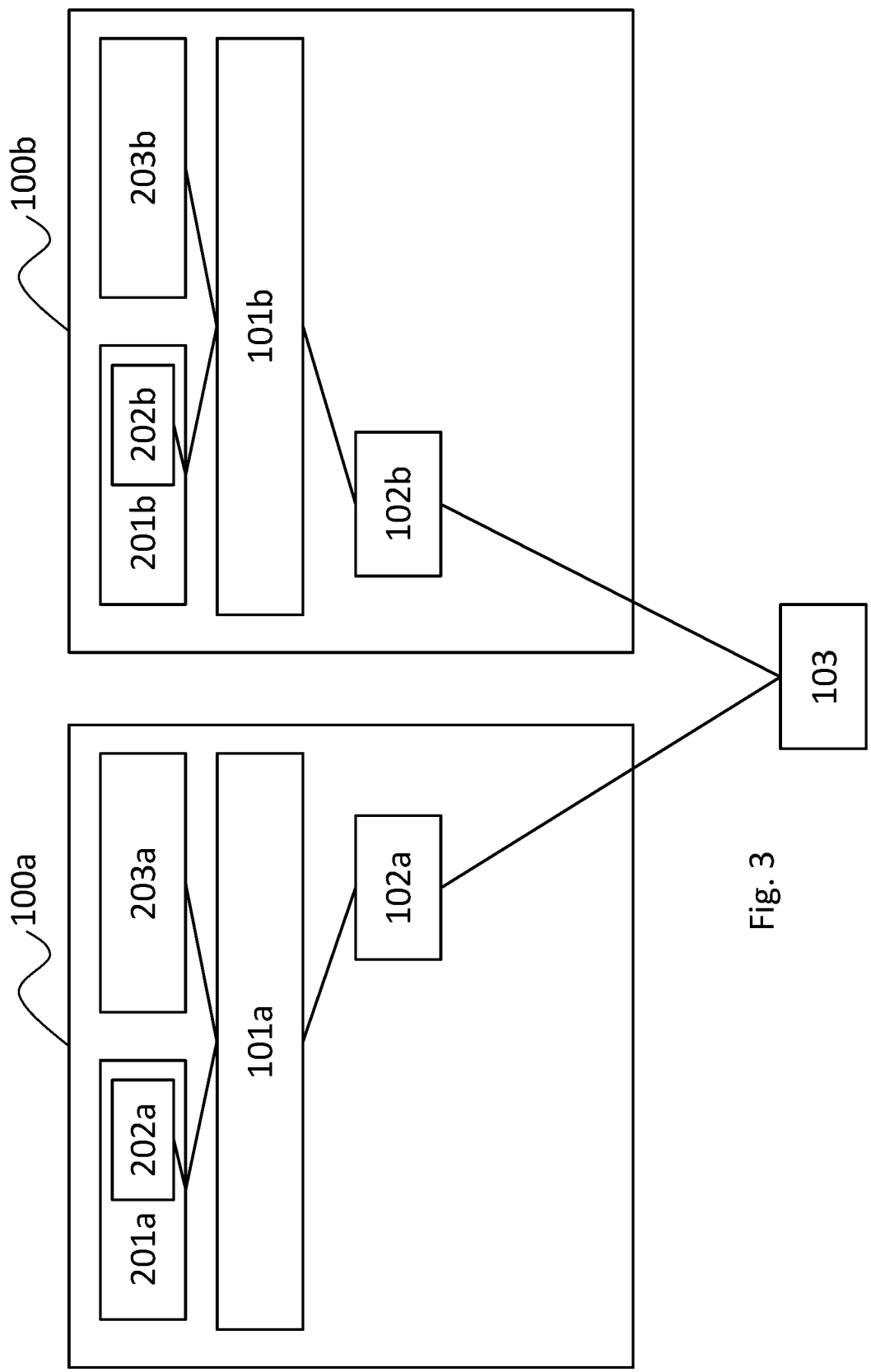
FIG. 3 shows a schematic overview of base stations and an application processing unit according to the present invention.

Turning now to FIG. 3, a specific operating manner of two base stations 100a, 100b and an application processing unit 103 according to an embodiment of the present invention is described. While in FIG. 3, two base stations 100a, 100b and one application processing unit 103 are shown, the operating manner as described in the following can also be applied to operating scenarios involving more than two base stations 100a, 100b and more than one application processing unit 103.

In FIG. 3, the base station 100a and the base station 100b are both communicating with the application processing unit 103 by means of an interface 102a, which is comprised by the base station 100a, and by means of an interface 102b, which is comprised by the base station 100b. As the application processing unit 103 is not comprised by the base station 100 in this case, the interfaces 102a, 102b are hardware interfaces 102a, 102b. Specifically, at least two base stations 100a, 100b can simultaneously communicate with at least one application processing unit 103.

Processing the vehicle control information and/or the traffic state information provided by different base stations 100a, 100b enables the application processing unit 103 to achieve more accurate results and to cover a larger geographical area when processing the vehicle control information and/or the traffic state information. As the application processing unit 103 is directly connected to the base stations 100a, 100b by means of the interfaces 102a, 102b, rapid exchange of information between the application processing unit 103 and the base stations 100a, 100b is provided. As the application processing unit 103 features a modular design, it can easily be adapted, respectively upgraded to cope with a large number of connected base stations 100a, 100b. The result of processing the vehicle control information and/or the traffic state information that was received from base station 100a can be forwarded by the application processing unit 103 to base station 100a, as well as to base station 100b. The application processing unit 103 in particular can forward the result of processing the vehicle control information and/or the traffic state information to all base stations 100a, 100b, which are connected to the application processing unit 103. This enables a way of sharing information among multiple base stations 100a, 100b, and in turn among multiple vehicles.

Figure 4:
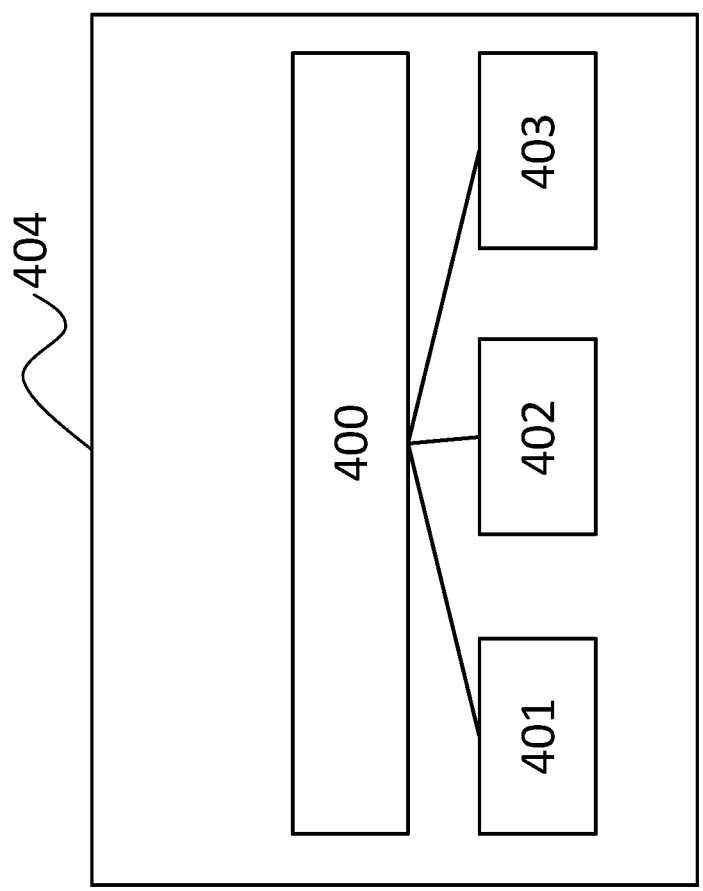
FIG. 4 shows a schematic overview of a vehicle control unit according to an embodiment of the present invention in more detail.

In FIG. 4, a schematic overview of a vehicle control unit 400 according to an embodiment of the present invention is shown. FIG. 4 shows the vehicle control unit 400, which is connected to a sensor 401, an actor 402, and a user interface 403. This enables the vehicle control unit 400 to derive from at least one sensor 401, at least one actor 402 or at least one user interface 403, the vehicle control information and/or the traffic state information. By exchanging information between the vehicle control unit 400 and the at least one sensor 401, the at least one actor 402 or the at least one user interface 403, the vehicle control information and/or the traffic state information can be derived or generated. While in FIG. 4 one exemplar of the sensor 401, the actor 402 and the user interface 403 each is shown, the vehicle control unit 400 can be connected to multiple sensors 401, multiple actors 402, and multiple user interfaces 403 simultaneously.

The sensors 401 and the actors 402 of the vehicle 404 can for example be all kind of sensors 401 and actors 402 which are connected to the vehicle's engine, steering, transmission, stability control, ABS, shock absorbers, lights, comfort functions, battery, geographical positioning system, integrated cameras and ultrasonic devices, airbags, heating and air-conditioning, vehicle control system, as well as any other module, unit or system comprised by the vehicle 404. The user interface 403 typically includes the vehicle's instrument cluster, screens, touch screens, control buttons, steering wheel, paddles, gear selector, as well as any other module, unit or system suitable for inputting or outputting user information.

The vehicle control unit 400 can be connected to a radio unit, which enables the vehicle control unit 400 to send and receive information, in particular the vehicle control information and/or the traffic state information and/or the result of processing the vehicle control information and/or the traffic state information, by means of wireless communication technologies e.g. according to a 3GPP standard such as GSM, UMTS, LTE or 5G and future standards. The radio unit is in particular used by the vehicle control unit 400 to communicate with the base station 100, in particular to send the vehicle control information and/or the traffic state information to the base station 100 and/or to receive the result of processing the vehicle control information and/or the traffic state information from the base station 100 for further processing in the vehicle control unit 400.

Preferably, the vehicle control unit 400 is in particular able to control at least one of the sensor 401, the actor 402 or the user interface 403 of the vehicle 404 according to the result of processing the vehicle control information and/or the traffic state information received from the base station 100.

The vehicle control information and/or the traffic state information generated by the at least one sensor 401, the at least one actor 402 or the at least one user interface 403, can be processed in the base station 100 by means of the at least one application processing unit 103. The result of processing the vehicle control information and/or the traffic state information can be transmitted back to the vehicle control unit 400 where it can be used to control at least one of the sensor 401, the actor 402 or the user interface 403 of the vehicle 404. Hence, a way is provided to expand the processing capabilities of vehicle electronics (i.e. all vehicle control units 400, sensors 401, actors 402, user interfaces 403 and any other electronic module, unit or system comprised by the vehicle 404) by processing the vehicle control information and/or the traffic state information in the base station 100.

The vehicle control unit 400 also enables to control applications and services provided by means of the communication networks in the at least one application processing unit 103 of the base station 100, and to receive information returning from the applications and services provided by the at least one application processing unit 103. The received information can be output by means of the user interface 403 of the vehicle 404 or can be used to control the sensors 401 and the actors 402 of the vehicle 404.

Figure 5:
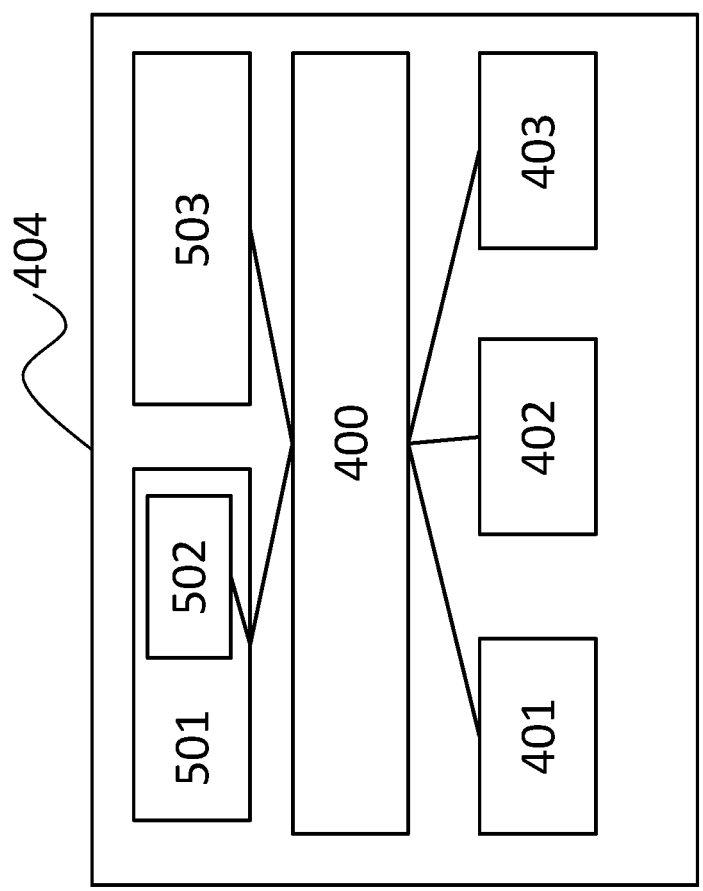
FIG. 5 shows a schematic overview of a vehicle control unit according to an embodiment of the present invention.

In FIG. 5, the vehicle control unit 400 of FIG. 4 is shown additionally connected to an error correction unit 501, which is optional. The error correction unit 501 can preferably apply error correction to the vehicle control information and/or the traffic state information sent by the vehicle control unit 400 and to the result of processing the vehicle control information and/or the traffic state information received by the vehicle control unit 400. Error correction enables more reliable delivery of information over an unreliable communication channel such as a wireless communication network. The error correction unit 501 can apply error detection schemes such as repetition codes, parity bits, checksums, cyclic redundancy checks, cryptographic hash functions and error correction codes for the detection of presence of errors in the transmitted information. Correction of errors can be achieved by automatic repeat requests, error correction codes and hybrid schemes. The error correction unit 501 provides to achieve the high reliability of transmission of information, which is necessary to be compliant with the requirements of vehicle industry standards.

The error correction unit 501, as shown in FIG. 5, can additionally comprise a determining unit 502. The determining unit 502 allows determining, whether the information sent and/or received by the vehicle control unit 400 is the vehicle control information and/or the traffic state information and/or the result of the processing. This information is provided to the error correction unit 501, which in turn only applies error correction to the vehicle control information and/or the traffic state information and/or the result of the processing which is received and/or sent by the vehicle control unit 400. By exclusively applying error correction to particular information, overall speed and efficiency of information processing in the vehicle control unit 400 is improved.

As depicted in FIG. 5, the vehicle control unit 400 additionally can be connected to a security unit 503. The security unit 503 can determine, whether the received result of processing the vehicle control information and/or the traffic state information is a permitted result of processing the vehicle control information and/or the traffic state information. The result of this analysis is communicated to the vehicle control unit 400 to exclusively control at least one of the sensor 401, the actor 402 or the user interface 403 of the vehicle 404 according to the permitted result of processing the vehicle control information and/or the traffic state information. The security unit 503 can on the one hand determine, whether the result of processing the vehicle control information and/or the traffic state information is sent by an authenticated sender or, on the other hand, whether it was altered on the way from the sender to the receiver. Hence the injection of malicious results of processing the vehicle control information and/or the traffic state information (which e.g. aims at inducing an accident or ineffective energy consumption of a vehicle 404) can be avoided.

As it is shown in FIGS. 4 and 5, the vehicle control unit 400 including the sensors 401, the actors 402 and the user interface 403, as well as optionally the error correction unit 501, the determining unit 502 and the security unit 503 can be comprised by a vehicle 404. A vehicle 404 can comprise at least one vehicle control unit 400, but also multiple vehicle control units 400. According to the present invention, vehicles 404 can be trains, heavy goods vehicles, trucks, buses, passenger cars, motorcycles, bikes, but also airplanes, helicopters, boats or any other means of transport operated with or without at least one engine.

In case that a vehicle 404 comprises multiple vehicle control units 400 according to the present invention, the multiple vehicle control units 400 can communicate with each other and commonly use the radio unit of a predefined vehicle control unit 400 to communicate with the base station 100. However, the multiple vehicle control units 400 can also use separate radio units to communicate with the base station 100.

Figure 6:
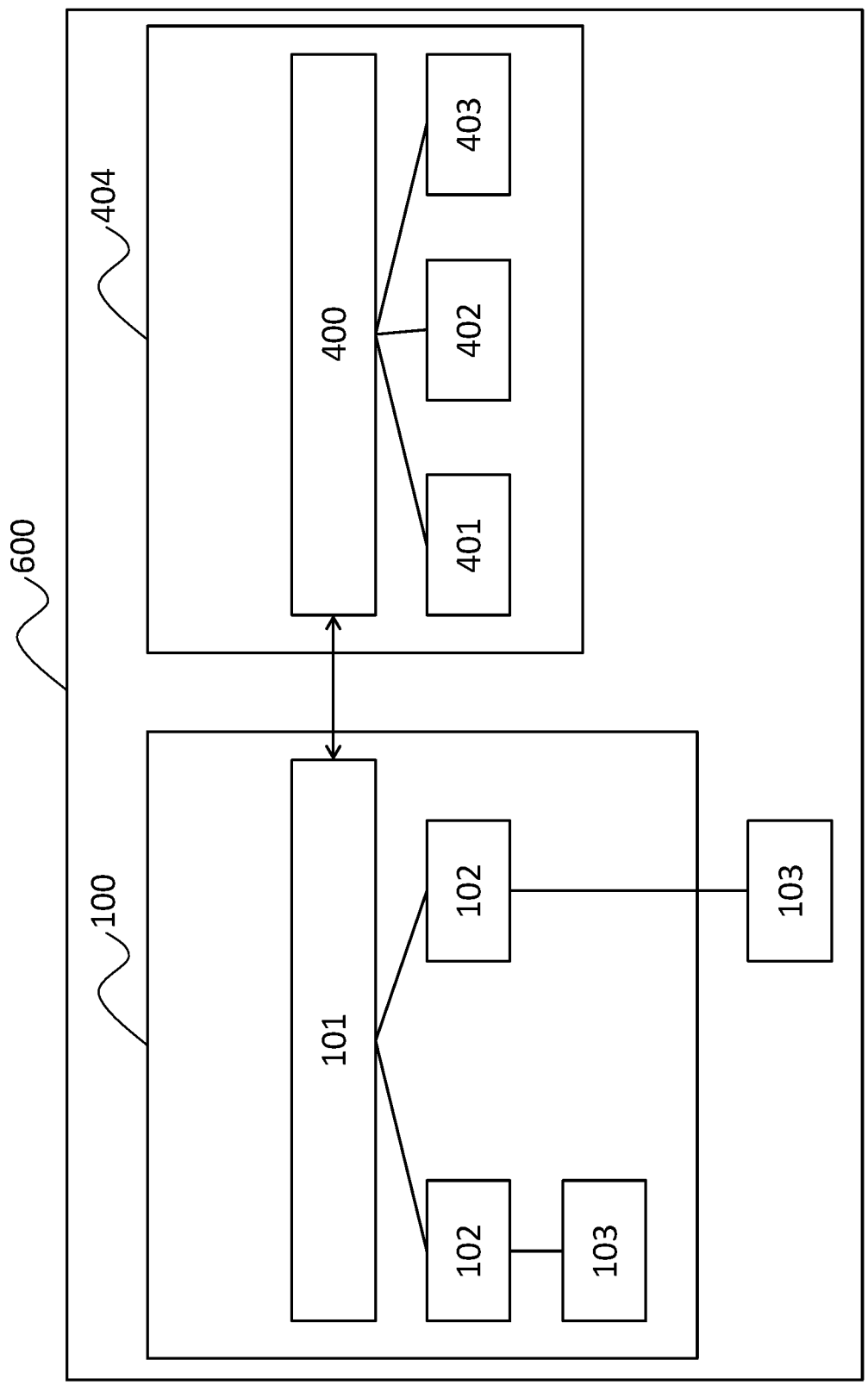
FIG. 6 shows a schematic overview of a system comprising a base station and a vehicle control unit according to an embodiment of the present invention.
Figure 7:
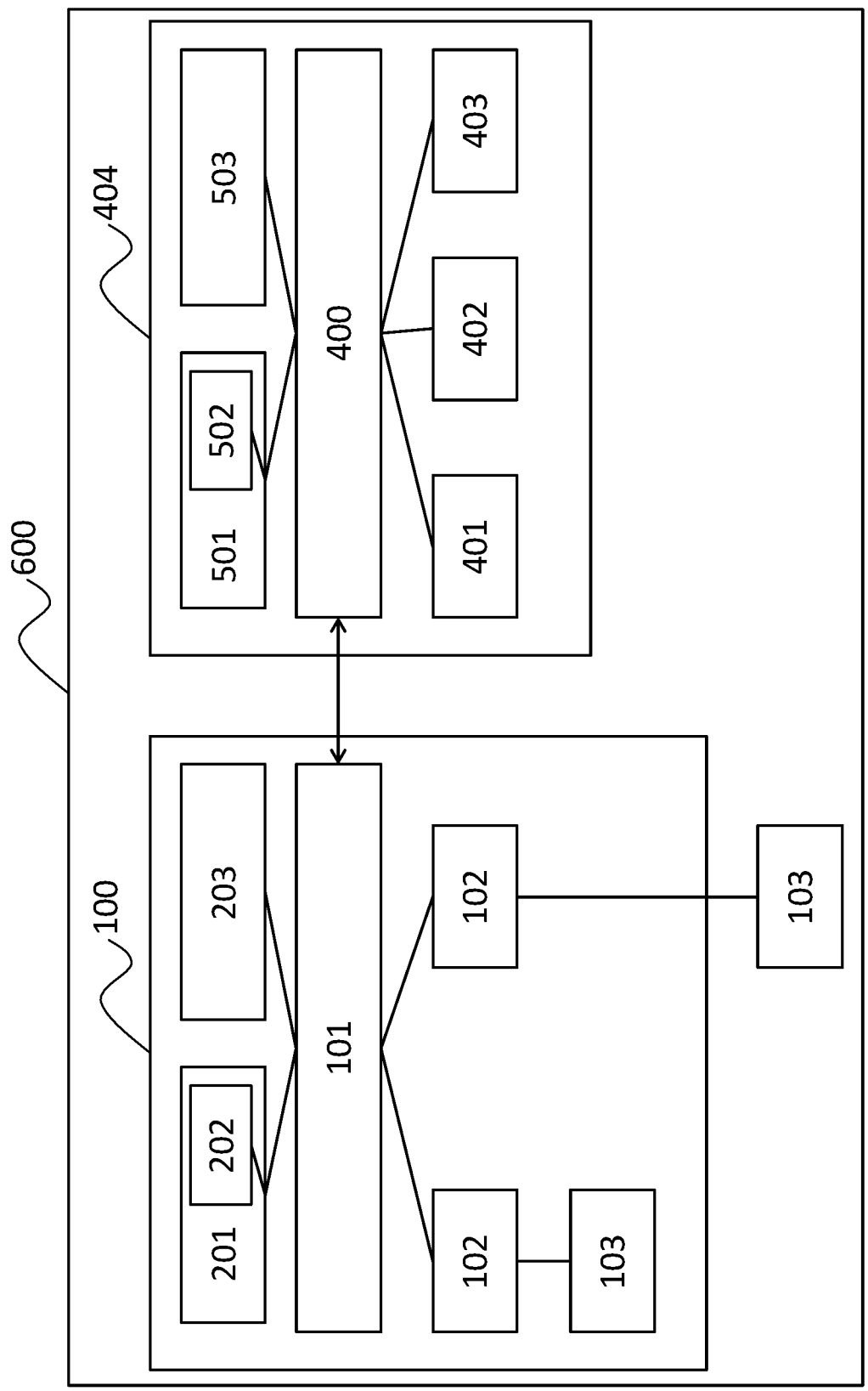
FIG. 7 shows a schematic overview of a system comprising a base station and a vehicle control unit according to an embodiment of the present invention in more detail.

In FIG. 6, a schematic overview of a system 600 comprising a base station 100 and a vehicle control unit 400 according to an embodiment of the present invention is shown. In FIG. 6 the base station 100 is one according to FIG. 1, and the vehicle control unit is one according to FIG. 4. Of course, as shown in FIG. 7 the system 600 can also comprise a base station 100 according to FIG. 2 and a vehicle control unit 400 according to FIG. 5. It is also possible that only the base station 100 or only the vehicle control unit 400 is equipped with the additional components shown in FIG. 2 and FIG. 5, respectively.

The base station 100 and the vehicle control unit 400 can communicate with each other, in particular by exchanging the vehicle control information and/or the traffic state information and/or the result of processing the vehicle control information and/or the traffic state information by means of their respective radio units, and process the vehicle control information and/or the traffic state information and/or the result of processing the vehicle control information and/or the traffic state information according to any operating principle that is described herein. While the FIGS. 6 and 7 show one base station 100 and one vehicle control unit 400, the system can comprise multiple base stations 100 and multiple vehicle control units 400, as long as there is at least one exemplar each.

In the following, example applications and services that can be provided by a system 600 according to the present invention are described. The system referred to in the following examples comprises at least one base station 100 and multiple vehicles 404, each comprising at least one vehicle control unit 400.

In a first example, multiple vehicles 404 transmit vehicle control information and/or traffic state information to a base station 100. The vehicle control information and/or the traffic state information preferably contains geographical positioning information of multiple or each of the multiple vehicles 404 and information about road condition collected by a camera in each of the multiple vehicles 404. The base station 100 provides this information to the at least one application processing unit 103. The at least one application processing unit 103 can detect irregular items, such as potholes or obstacles on the road surface in the information about road condition, collected by the camera in each of the multiple vehicles 404. The at least one application processing unit 103 can additionally recognize the geographical position of each irregular item by means of the geographical positioning information provided by each of the multiple vehicles 404. The results of the processing in the at least one application processing unit 103 can be sent back to the multiple vehicles 404 for further use, e.g. for collision avoidance. The information about road condition can also be detected by other sensors in the multiple vehicles 404, e.g. sensors in the shock absorbers of the multiple vehicles 404 can be used to detect pot holes. After processing this information in the at least one application processing unit 103, the base station 100 can provide the result of the processing to the multiple vehicles 404. The multiple vehicles 404, which receive the transmitted result of processing the vehicle control information and/or the traffic state information from the base station 100, then can adjust their moving direction and shock absorber performance accordingly.

In a second example, multiple vehicles 404 transmit vehicle control information and/or traffic state information containing information collected from the multiple vehicle's ABS system, shock absorbers, traction control and geographical positioning system, to a base station 100. The base station 100 provides this information to the at least one application processing unit 103, which can collect and evaluate the vehicle control information and/or the traffic state information provided by the multiple vehicles 404, which are for example driving in the same geographical area. Evaluating the collected vehicle control information and/or the collected traffic state information can e.g. be used for a critical condition analysis or for a best performance analysis. Results of the critical condition analysis can be geographical positions where accidents are very likely, while results of the best performance analysis can be used to adjust operating parameters of the multiple vehicles 404 to improve driving comfort, speed and energy consumption. The results of e.g. the critical condition analysis or the best performance analysis can be encoded in the result of processing the vehicle control information and/or the traffic state information and can be sent back by the base station 100 to the multiple vehicles 404. The vehicle users can be charged for receiving this kind of vehicle control information and/or traffic state information or receive the information for free.

In a third example, multiple vehicles 404 transmit vehicle control information and/or traffic state information containing information about the multiple vehicles' engine management and transmission settings, as well as geographical position information of the multiple vehicles 404, to a base station 100. The base station 100 provides this information to the at least one application processing unit 103, which can collect and evaluate the vehicle control information and/or the traffic state information provided by the multiple vehicles 404, which are for example driving in the same geographical area. Evaluating the collected vehicle control information and/or the collected traffic state information can e.g. be used to determine optimized engine management and transmission setting parameters to optimize the multiple vehicles' energy consumption in a given geographical area. The optimized engine management and transmission setting parameters can be encoded in the result of processing the vehicle control information and/or the traffic state information and can be provided to the multiple vehicles 404 by means of the base station 100.

In a fourth example, multiple vehicles 404 transmit vehicle control information and/or traffic state information containing information collected by the vehicles sensors (e.g. onboard cameras), together with status messages of the vehicles 404, as e.g. specified by the European Telecommunications Standards Institute (ETSI) in the Cooperative Awareness Message (CAM) and Decentralized Environmental Notification Message (DENM) standards, to a base station 100. The base station 100 provides this information to the at least one application processing unit 103, which can collect and analyze the vehicle control information and/or the traffic state information provided by the multiple vehicles 404. Results of a combined analysis of the information provided by the multiple vehicles' sensors and of the status messages according to CAM/DENM, in the at least one application processing unit 103 can be provided to the multiple vehicles 404 by the base station 100 encoded in the result of processing the vehicle control information and/or the traffic state information.

In a fifth example, multiple vehicles 404 transmit vehicle control information and/or traffic state information, containing information collected by onboard cameras and geographical positioning sensors of the multiple vehicles 404, to a base station 100. The base station 100 provides this information to the at least one application processing unit 103 to perform analysis for law-enforcement purposes, e.g. to detect speeding, passing of solid lanes or other offenses. Results of the analysis can be provided to authorities or government by the base station 100 via the core communication network or the radio unit.

In a sixth example, multiple vehicles 404 transmit vehicle control information and/or traffic state information, containing position and speed of the multiple vehicles 404, to a base station 100. Additionally, other road users, such as pedestrians and cyclists as well as traffic lights and traffic management systems are reporting the traffic state information to the base station 100. The road users, such as pedestrians and cyclists, can collect and transmit the traffic state information by means of a user equipment provided with a geographical positioning sensor and a radio unit, e.g. a mobile phone each road user is carrying. The traffic state information collected by the road users includes information regarding geographical position, moving direction and speed of the road users. The traffic lights and the traffic management systems can collect the traffic state information including information about traffic flow or traffic congestion. The traffic lights and the traffic management systems can be connected to the base station 100 by means of wireless communication technologies as well as by the wired core communication network. The base station 100 provides the traffic state information to the at least one application processing unit 103. The at least one application processing unit 103 can determine information about the presence of the road users in the vicinity of each of the multiple vehicles 404. Information about the presence of the road users in the vicinity of each of the multiple vehicles 404 can be encoded in the result of processing the traffic state information and can be transmitted to each of the multiple vehicles 404 by the base station 100. The result of processing the traffic state information provided to each of the multiple vehicles 404 can be used for collision avoidance between each of the multiple vehicles 404 and the road users present in the vicinity of each of the multiple vehicles 404, e.g. when pedestrians or cyclists are on a road, or a traffic jam occurs.

Figure 8:
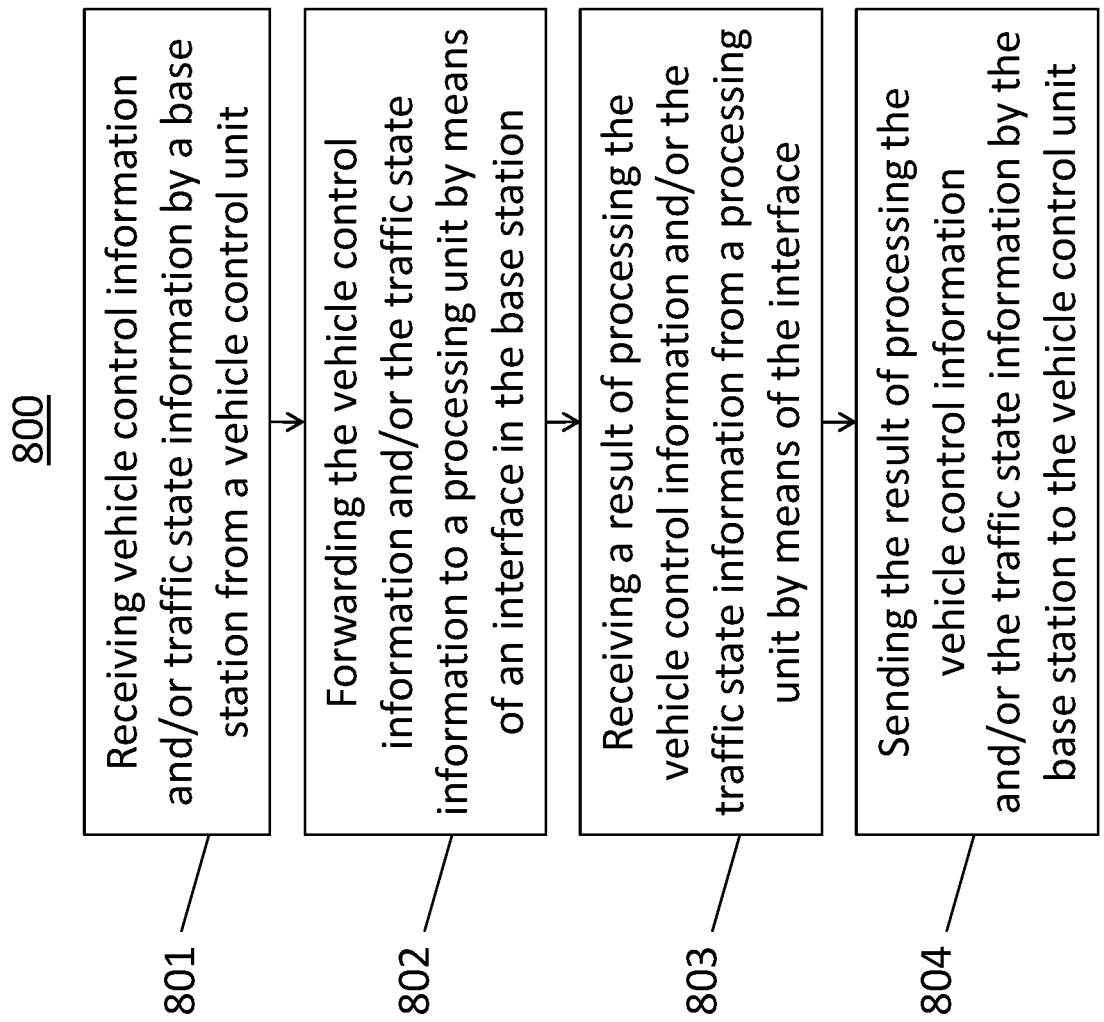
FIG. 8 shows a flow-diagram of a method according to an embodiment of the present invention.

FIG. 8 shows a method 800 according to an embodiment of the present invention. Preferably, the method is carried out by one of the base stations 100 described above. The method comprises a first step 801 of receiving, by the base station 100, vehicle control information and/or traffic state information that is sent by a vehicle control unit 400. In a second step 802, the method includes forwarding, by a base band unit 101 of the base station 100, the vehicle control information and/or the traffic state information to a (i.e. at least one) application processing unit 103 by means of a (i.e. at least one) interface 102 comprised in the base station 100. In a third step 803, the method comprises receiving, by the base band unit 101 of the base station 100, a result of processing the vehicle control information and/or the traffic state information from a (preferably the at least one from step 802) application processing unit 103 by means of a (preferably the at least one from step 802) interface 102. In a fourth step 804, the method includes sending, by the base station 100, the result of processing the vehicle control information and/or the traffic state information to the vehicle control unit 400.

FIG. 9 shows a method 900 according to an embodiment of the present invention. Preferably, the method is carried out by one of the vehicle control units 404 described above. The method comprises a first step of deriving 901, by a vehicle control unit from at least one of a sensor 401, an actor 402 or a user interface 403 of a vehicle 404 vehicle control information and/or traffic state information. Further, the method 900 comprises a second step of sending 902, by the vehicle control unit 400, the derived vehicle control information and/or the traffic state information to a base station 100. Further, the method 900 comprises a third step of receiving 903, by the vehicle control unit 400, from the base station 100 a result of processing the sent vehicle control information and/or the sent traffic state information.

Further, the method 900 comprises a fourth step of processing 904, by the vehicle control unit 400, said received result of processing.

The invention has been described in conjunction with various embodiments herein. However, other variations to the enclosed embodiments can be understood and effected by those skilled in the art and practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the internet or other wired or wireless telecommunication systems.

The invention claimed is:

1. A base station for receiving one or more of vehicle control information and traffic state information from a vehicle control unit of a vehicle connected to the base station, the base station comprising:
   at least one interface;
   a baseband unit connected to the at least one interface; and
   a security unit configured to determine whether the one or more of vehicle control information and traffic state information was altered before the receipt of the one or more of vehicle control information and traffic state information;
   wherein the at least one interface is configured to communicate with at least one application processing unit for processing the one or more of vehicle control information and traffic state information in the at least one application processing unit, and to receive a result of the processing from the at least one application processing unit;
   wherein the baseband unit is configured to forward the result of the processing to the vehicle control unit, and the vehicle control information includes information regarding a user interface of at least one vehicle.

2. The base station of claim 1, wherein
   the base station is a base station according to a 3GPP standard.

3. The base station of claim 1, wherein
   the at least one interface comprises a software interface and the at least one application processing unit is part of the base station, or
   the at least one interface comprises a hardware interface connectable to the at least one application processing unit, or
   the at least one interface comprises the software interface and the hardware interface connectable to the at least one application processing unit, the at least one application processing unit is part of the base station.

4. The base station of claim 1, wherein
   the vehicle control information further includes information regarding at least one of a sensor or an actor of the at least one vehicle.

5. The base station of claim 1, wherein
   the traffic state information includes information regarding one or more of position and movement of at least one of a pedestrian, a bicycle, or another vehicle, or the traffic state information includes information provided by at least one traffic light or at least one traffic management system, or the traffic state information includes information regarding the one or more of position and the movement of at least one of the pedestrian, the bicycle, or the other vehicle, and information provided by the at least one traffic light or the at least one traffic management system.

6. The base station of claim 1, further comprising
   an error correction unit configured to apply error correction to one or more of the vehicle control information, the traffic state information received by the base station, and the result of the processing forwarded by the base station.

7. The base station of claim 6, wherein
   the error correction unit comprises a determining unit configured to determine whether one or more of received and sent information is one or more of the vehicle control information, the traffic state information and the result of the processing and to apply the error correction to the one or more of the received and the sent information when the one or more of the received and the sent information is the one or more of the vehicle control information, the traffic state information and the result of the processing.

8. The base station of claim 1, wherein
   the at least one interface is further configured to communicate with the at least one application processing unit to exclusively process one or more of the vehicle control information and the traffic state information in the at least one application processing unit.

9. A method, comprising:
   receiving, by a base station, one or more of vehicle control information and traffic state information from a vehicle control unit connected to the base station;
   determining, by the base station, whether the one or more of vehicle control information and traffic state information was altered before the receipt of the vehicle control information;
   forwarding, by the base station, the one or more of vehicle control information and traffic state information to at least one application processing unit through at least one interface comprised in the base station;
   receiving, by the base station, a result of processing the one or more of vehicle control information and traffic state information from the at least one application processing unit through the at least one interface; and
   sending, by the base station, the result of the processing to the vehicle control unit;
   wherein the vehicle control information includes information regarding a user interface of at least one vehicle.

10. A vehicle control unit, comprising:
    a processor coupled to a memory storing instructions, which when executed by the processor, cause the processor to perform operations, the operations including
    deriving from at least one of a sensor, an actor or a user interface of one or more of vehicle control information and traffic state information;
    communicating with a base station to send the one or more of the derived vehicle control information and the traffic state information to the base station, and receiving from the base station a result of processing one or more of the sent vehicle control information and the sent traffic state information, wherein the base station determines whether the one or more of vehicle control information and traffic state information was altered before the receipt of the vehicle control information; and processing the received result of the processing.

11. The vehicle control unit of claim 10, wherein the operations further include:

controlling the at least one of the sensor, the actor or the user interface of the vehicle according to the result of the processing received from the base station.

12. The vehicle control unit of claim 10, wherein the operations further include:

applying error correction to one or more of the vehicle control information, the traffic state information sent to the base station, and the result of the processing received from the base station.

13. The vehicle control unit of claim 12, wherein applying the error correction to the one or more of the vehicle control information, the traffic state information sent to the base station, and the result of the processing received from the base station comprises:

determining whether one or more of received and sent information is one or more of the vehicle control information, the traffic state information and the result of the processing, and applying the error correction to the one or more of the received and sent information when the one or more of the received and the sent information is the one or more of the vehicle control information, the traffic state information and the result of the processing.

14. The vehicle control unit of claim 10, wherein the operations further include:

determining whether the result of the processing received from the base station is a result of processing, and exclusively controlling the at least one of the sensor, the actor or the user interface of the vehicle according to the result of processing.

* * * * *